United States Patent [19]

Klingelhoefer et al.

[11] 4,151,037

[45] Apr. 24, 1979

[54] DEVICE FOR APPLYING BINDING STRIPS TO THE BACKS OF LAYERS OF PAPER

[75] Inventors: Hannsgeorg Klingelhoefer; Friedrich Mann, both of Nuertingen, Fed. Rep. of Germany

[73] Assignee: Bielomatik Leuze & Co., Fed. Rep. of Germany

[21] Appl. No.: 874,585

[22] Filed: Feb. 2, 1978

[30] Foreign Application Priority Data

Feb. 24, 1977 [DE] Fed. Rep. of Germany ....... 2708066

[51] Int. Cl.² ........................ B32B 31/00; B42C 19/00

[52] U.S. Cl. ................................ 156/477 B; 156/522; 11/1 R

[58] Field of Search .............. 156/522, 477 B; 11/1 R

[56] References Cited

U.S. PATENT DOCUMENTS

| | | | |
|---|---|---|---|
| 2,776,068 | 1/1957 | Johnson | 156/522 |
| 3,804,694 | 4/1974 | Blair | 156/522 |

*Primary Examiner*—Douglas J. Drummond

*Attorney, Agent, or Firm*—Steele, Gould & Fried

[57] ABSTRACT

The present specification describes and claims a device for applying binding strips to the backs of stacks of paper layers such as books, pads or the like. The device comprises an application station by means of which a binding strip supplied by a feed device, can be applied to the stacks of paper. A cutting device for cutting the binding strip is arranged to be effective directly behind the trailing edge of each stack of paper. Further, a controllable pressing device is located so as to be able to move the stacks of paper and the application station towards one another in a controlled manner, and to press one against the other.

24 Claims, 4 Drawing Figures

DEVICE FOR APPLYING BINDING STRIPS TO THE BACKS OF LAYERS OF PAPER

Figure 1:
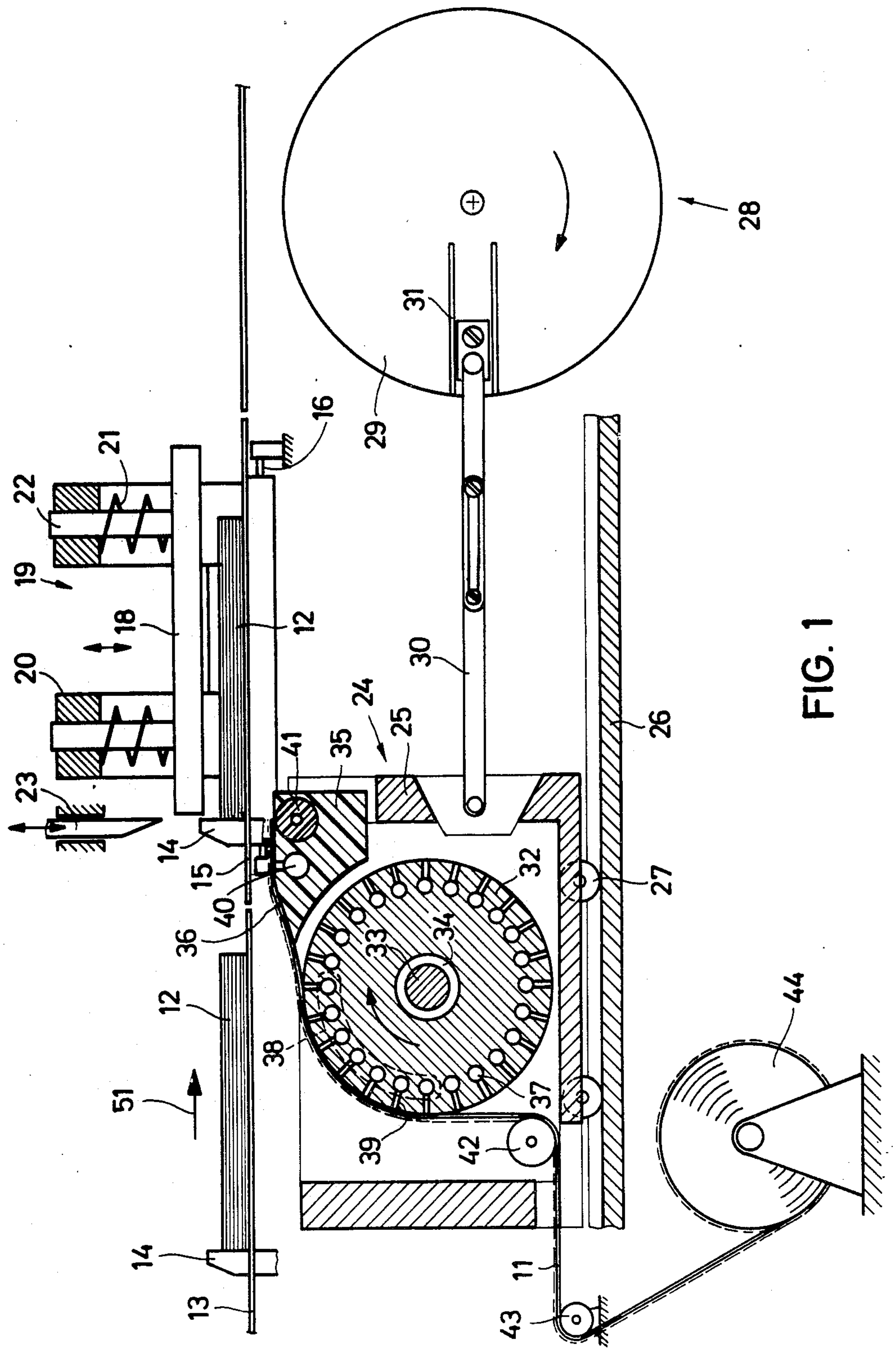

The present invention relates to a device for applying binding strips to the backs of stacks of paper layers such as books, pads or the like which comprises an application station, by means of which the binding strips may be applied to the layers of paper which are fed at intervals through the device, a cutting device for cutting off the required length of binding strip and a feed device for the binding strips to to the application station.

Such a device is known from German Utility Model 1 929 525. This deals with the application of a gauze strip to a book spine which has been previously glued in another station. The gauze strip is cut in a cutting device into portions of the required length, is then placed on a roller or cylinder and is held pressed against this by means of a section of tape. The gauze strips are located on the application roller at already the correct distance from one another and are then applied to the book spines which run continuously past the application roller. A precondition of such a device is a precise, so to speak anticipatory control of the cutting device so that a sensor device for controlling the cutter has to be placed well in front of the application station. This increases the overall length of the device. Furthermore, the spines of the books must be glued in a separate station. It is not possible to use self-adhesive binding strips.

So-called longitudinal folding is also known, such as is proposed, for example, in German Patent Application No. P 26 28 536.9. In this case, the binding strip is continuously applied, i.e. it also spans the gaps between the individual layers. The binding tape is cut at these bridging points and is later cut to size. This produces a wastage of between 3 and 10% and if self-adhesive strips are used the cutters may also become dirty and cause the machine to break down. It is also known practice to cut the binding tape clean immediately along the layer. The circular cutters used for this, however, become fouled up with waste material when self-adhesive strips are used so that each time the entire system has to be stopped while the cutter is cleaned.

Another known practice is so-called transverse folding wherein the adhesive tape roller must have the same width as the layer. This necessitates a wide selection of roller widths for different formats.

An aim of the present invention is to provide a device for applying binding strips of the type mentioned initially which does not require a separate gluing station, enables precise locating of the binding tape on the layer of paper and operates without wasting binding strip.

According to the present invention there is provided a device for applying binding strips to the backs of stacks of paper layers such as books, pads or the like, which comprises an application station by means of which the binding strips can be applied to the stacks of paper which are fed at intervals through the device, a feed device for feeding the binding strips to the application station, a cutting device for cutting off the required length of binding strip, the cutting device being arranged to, in use, be effective directly behind the trailing edge of each stack of paper, and a controllable pressing by means of which the stacks of paper and the application station may be moved towards one another in controlled manner and pressed against one another.

A binding tape which is provided with adhesive and is in particular self-adhesive may preferably be used in the device. An embodiment is particularly preferred wherein the application station is disposed on a reciprocating carriage. Movement of the stacks through the device may preferably be intermittent and each stack may remain stationary while the binding strip is applied.

In the device according to the invention, each stack is urged by the controlled pressing device towards the application station which may then press the binding strip during its movement relative to the stack of paper onto said stack. Although the binding tape is supplied in an uncut state and is not even cut to length when it is glued onto said stack of paper, the cutter operating directly behind the stack of paper ensures a clean cut and no waste.

Figure 2:
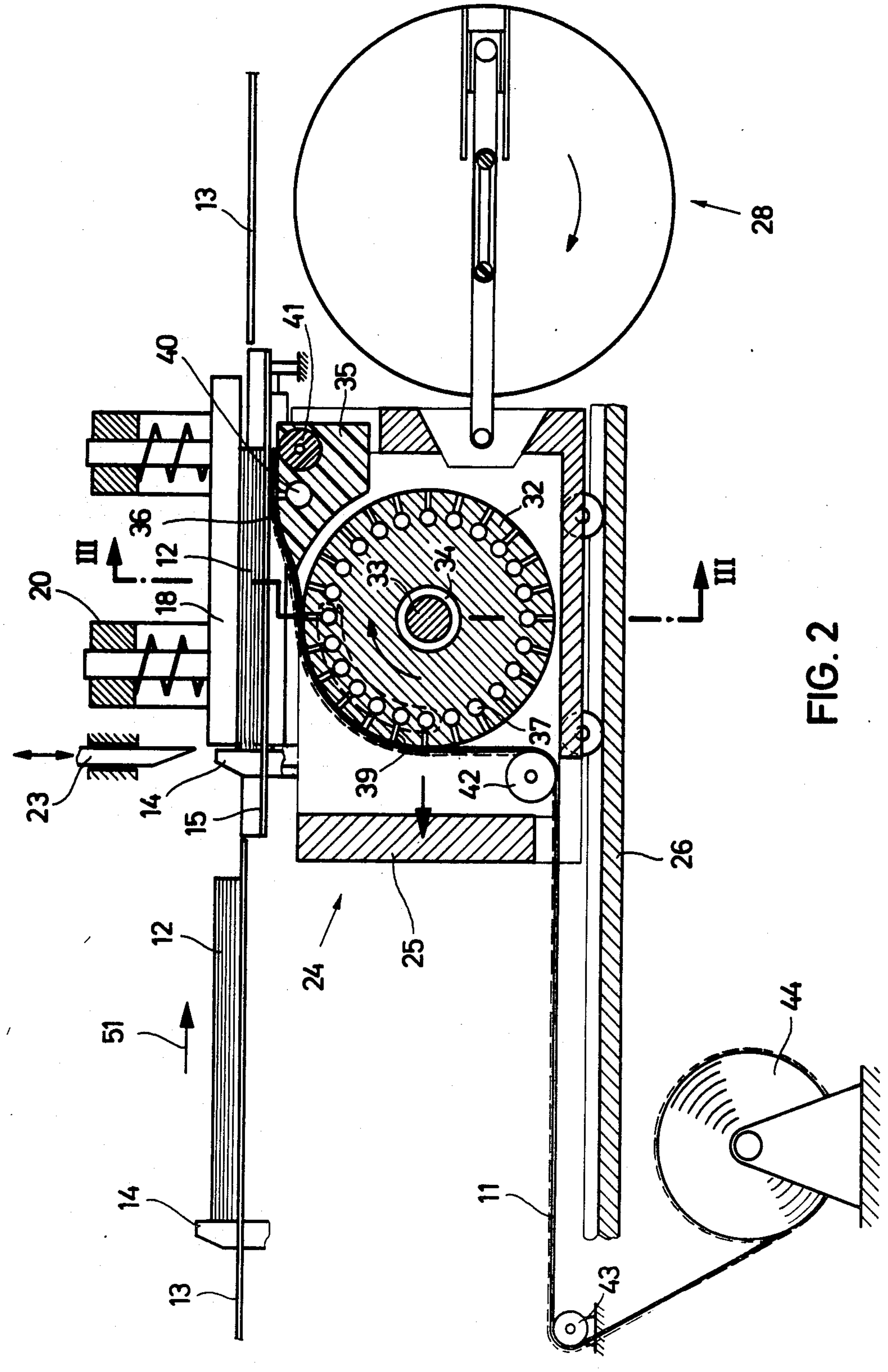
Figure 3:
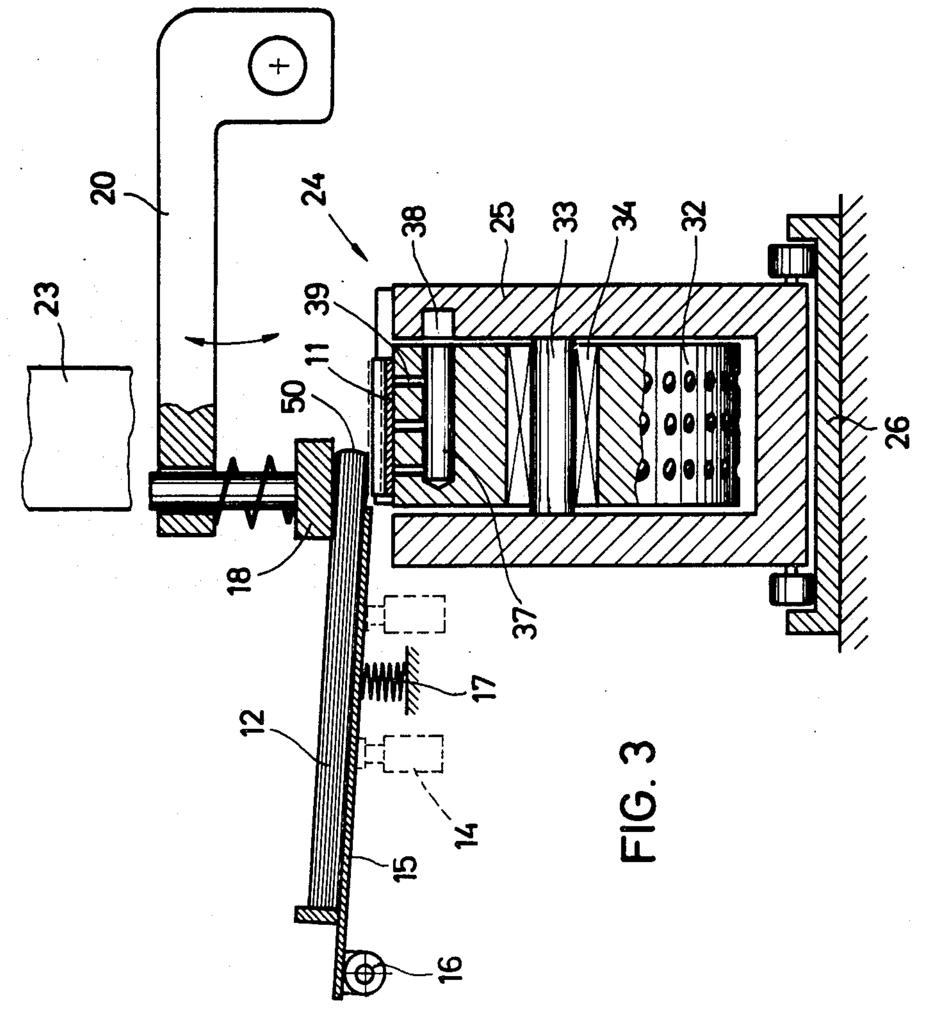

The present invention will now be further described, by way of example, with reference to the accompanying drawings, in which:

FIG. 1 a diagrammatic side view, partially in section, of one embodiment of a device according to the invention;

FIG. 2 the device in a similar manner of illustration to FIG. 1 but in a different working position;

FIG. 3 a section along the line III—III of FIG. 2, and

Figure 4:
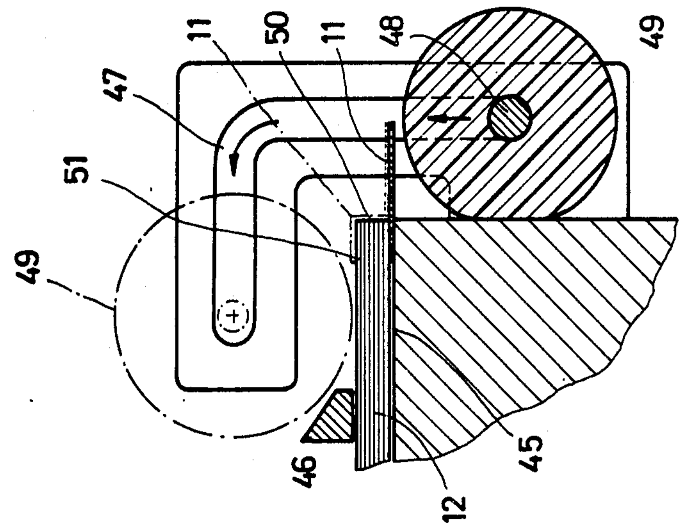

FIG. 4 a diagrammatic partial section of a follow-up station (direction of section as in FIG. 3).

The drawings show a device for applying preferably self-adhesive binding strips 11 on stacks of paper 12. The stacks of paper are moved horizontally on a table 13 or a conveying device of another type in a flat state by feed elements 14.

A portion 15 of the table is separated from the rest of the table 13 and is pivotable about an axis 16. A compression spring 17 normally holds the table portion 15 in its upper horizontal position.

The table portion 15 with a clamping bar 18 disposed above it forms a pressing station 19. The clamping bar 18 is controllable in a vertical direction by way of swivel arms 20 (see FIG. 3) which are pivotable by the machine drive, for example by way of a cam (not shown), in such a manner that they press the clamping bar towards the stack of paper lying on the table portion 15 and may urge these downwards by pivoting the portion 15. The clamping bar 18 is resiliently journalled by means of compression springs 21 and columns 22 which are displaceably guided in the arms 20.

A cutter 23, which is guided in a vertical direction and is movable by a drive (not shown), is disposed in front of the clamping bar, seen in the feed direction (from left to right).

An applying station 24 is also provided which comprises a carriage or slide 25 which is horizontally reciprocably guided. In the diagrammatic embodiment a guideway 26 is provided on which rollers 27 of the carriage run. A slide conveyor or some other suitable means for guiding the carriage 25 may however alternatively be used. In the illustrated example, the carriage is driven by a crank gear 28 whose crankarm or crank disc 29 is rotatably journalled. It is indicated in the drawing that not only the point of application of the piston rod 30 which moves the carriage on the crank disc 29 is displaceable in a guide 31 but also the length of the piston rod so that it is possible to adjust the carriage in such a manner that its left end position remains the same even when another carriage stroke is adjusted. In this case also, any other device is possible to ensure adjustability of the stroke with a constant end position.

The carriage 25 comprises a suction wheel 32 which is journalled on a horizontal shaft 33 by way of an idle running device 34 which allows the suction wheel to rotate in a clockwise direction only, i.e. in the direction of feed of the layers of paper 12, and blocks the other direction of rotation. The carriage 25 forming the applying station also has a guide shoe 35 made of synthetic material which projects slightly beyond the upper edge of the carriage and thus forms a horizontal, somewhat elevated pressure surface 36.

Suction channels 37 are disposed in the suction wheel 32 and extend in the edge region round the entire periphery parallel to the shaft 33. These are pocket bores which penetrate only one of the front sides of the suction wheel 32 and are connected there to a suction channel 38 in a side of the carriage 25. The suction channel 38 indicated by a dashed line in FIG. 1, extends only slightly over a quarter of the periphery of the suction wheel so that before and after this point the binding tape is no longer drawn by suction. Suction bores 39 lead from the suction channels 37 to the surface of the suction wheel so that the entire surface of the suction wheel 32 is provided with several rows of suction openings.

An air channel 40 is also provided in the guide shoe 35 and its air supply is controllable in such a manner that it may be connected during a working stroke alternately to vacuum intake air or compressed air.

Also located in the guide shoe 35 is a roller 41 which is made from a relatively mildly resilient synthetic material of good wearability such as, for example, polyamide and which serves as an abutment, i.e. as an "anvil" for the cutter 23. This roller is turned round further manually when required, i.e. in the event of wear of the opposing cutting surface, by a specific angular amount.

The carriage also has a guide roller 42. A guide 43 for the binding tape is also provided on a machine-fixed part which feeds the binding tape 11 from a supply roller 44 which is similarly supported on the frame of the machine.

FIG. 4 shows the station which follows on from the application device shown in FIGS. 1 to 3. In the plane of the table 13 there is a table 45 on which the stacks of paper 12 are intermittently, i.e. gradually, conveyed by the feed elements 14. A clamping bar 46 holds down the stack of paper to be processed. A guide 47 is provided for the horizontal axis 48 of an impression roller 49. The guide is angular and extends in a vetical direction along the back of the layer of paper and then with substantially the same gap along the upper side of stack of paper. In the illustrated example, an impression roller made from a mildly resilient synthetic material is used which has a specific inherent springiness so that it can exert a resilient pressure on the front side of the table 45 and the subsequently conveyed backs 50 of the stack of paper as well as on the upper edge region 51 adjacent to the backs which is to be covered by the binding strip whenever the roller is guided by a drive device (not shown) upwards and then parallel to the upper side of the stack of paper. However, instead of or in addition to the inherently resilient construction, it is also possible to make the bearing of the roller or of the guide resilient.

The described device operates according to the following method:

The stacks of paper 12 are moved intermittently, i.e. gradually through the device by the feed elements 14. The feed elements 14 are at a fixed distance from one another i.e. even when the format of the stacks of paper changes, the spacing remains the same and the size of the gap between the stacks of paper varies. The gradual movement (from left to right) is so adjusted that the stack of paper located under the clamping bar 18 stops with its trailing end exactly at the point at which the cutter 23 works. At the beginning of the working stroke, the carriage has been moved by the crank gear 28 into the righthand position shown in FIG. 2. This position is set exactly so that the beginning of the binding tape (cutting point on the centre of the roller 41) stands exactly at the beginning of the stack of paper. The stack of paper lies with its back facing the viewer of FIGS. 1 and 2.

During the forward movement of the carriage 25 (in FIGS. 1 and 2 to the right), a length of binding tape 11 corresponding to the stroke of the carriage 25 is drawn over the roller 43 from the supply 44. This binding tape is a self-adhesive tape whose self-adhesive side is facing substantially upwards in the application station and is indicated in the drawings by a dotted line. The leading edge of the self-adhesive tape on the carriage was held firmly in that the suction bores 39 are connected by the channels 37 and 38 to a vacuum source and they therefore hold the non-adhesive side of the binding tape 11 firmly on the suction wheel 32. The idle running device blocks in this direction. The free end of the binding tape is also held fast on the pressure surface of the guide shoe 35 by the air channel 40 and its suction bores facing the pressure surface 36.

The clamping bar 18 is then urged downwards by the swivel arms 20 by means of a control (not shown) and presses resiliently onto the upper side of the stack of paper 12 meanwhile pivoting the table portion 15 against the force of the spring 17 slightly downwards so that the lower edge region of the stack of paper 50 adjacent to the back 50 is pressed onto the self-adhesive surface of the binding tape.

It should be noted that, as may be seen in FIGS. 3 and 4, the binding tape (and correspondingly the suction wheel 32) is substantially wider than the region now adhered. The binding strip is wider by the width of the back and the width of the portion still to be glued on the upper side.

The carriage is then moved back again by the crank gear 28 against the direction of feed 51 of the stacks of the stacks of paper 12, whereupon the guide shoe runs along the underside of the layer of paper and presses the binding strip over the entire length of the stack of paper 12. The binding strip is automatically released at the required length as a result of the backward movement of the carriage (the gap between the rollers 42 and 43 becomes correspondingly shorter) and the suction wheel 32 may rotate in this direction (clockwise) as a result of the idle running device. During this activity the air channel 40 is acted upon, not as before with suction intake air, but with compressed air so that an air cushion forms between the guide shoe 35 and the binding tape which improves smooth sliding of the binding tape on the guide shoe.

Since the stroke of the carriage 25 is so adjusted that it stops in exactly the position shown in FIG. 1, namely with the roller 41 under the cutter, the cutter 23 may be moved vertically downwards and may cut the binding strip 11 exactly behind the stack of paper. The roller 41 as an abutment ensures a clean cut. The clamping bar 18 is then moved upwards again. The table portion 15 pivots up again and the cycle may begin anew. This position is shown in FIG. 1.

In the follow-up station shown in FIG. 4, the stacks of paper are disposed initially with a binding strip 11, as illustrated, projecting beyond the back laterally. The impression roller 49 is then moved out of the lower position shown in FIG. 4 upwards and following the guideway 47 to the left, i.e. towards the stack of paper 12, when it then as a result of the pressure produced by inherent resilience presses the binding strip 11 onto the back 50 first and then onto the upper adjacent edge region 51. This final state of the binding tape 11 and the end position of the impression roller 49 is shown by a dash-dot line in FIG. 4.

It is evident that the invention presents numerous advantages. Self-adhesive tape may be used and this is applied to the stack of paper, which is generally previously stitched or joined in some other way, with the most precise and economical guidance. The binding tape is immediately cut to the correct length without producing waste which could attach itself to the cutter or other machine parts. Application of the binding strip at other points is also simple and is effected with the necessary pressure to ensure good adhesion of the self-adhesive tape. The described construction with a reciprocating carriage is particularly advantageous because the exact positioning of the leading edge of the binding tape is determined by the end position of the carriage whereas, with continuous supply of the stacks of paper, it is determined by the exact moment of time at which the clamping bar 18 is lowered. There is also the advantage that the tightening of the binding strip is simultaneously effected by the reciprocating movement of the carriage 25. In place of the suction wheel and the guide shoe, other devices could be provided on the application station but the illustrated arrangement has proved itself to be particularly advantageous.

We claim:

1. A device for applying binding strips to the backs of stacks of paper layers such as books, pads or the like, which comprises an application station by means of which the binding strips can be applied to the stacks of paper which are fed at intervals through the device, a feed device for feeding the binding strips to the application station, a cutting device for cutting off the required length of binding strip, the cutting device being arranged to, in use, be effective directly behind the trailing edge of each stack of paper, and a controllable pressing device by means of which the stacks of paper and the application station may be moved towards one another in a controlled manner and pressed against one another.

2. A device according to claim 1, wherein the binding strip is provided with adhesive.

3. A devife according to claim 2, wherein the binding strip is a self-adhesive tape.

4. A device according to claim 1, wherein the application station is disposed on a reciprocating carriage.

5. A device according to claim 1, wherein the stacks of paper are fed intermittently through the device and each stack of paper is stationary while the binding strip is applied.

6. A device according to claim 4, wherein the binding strip is applied during the backward movement of the carriage.

7. A device according to claim 4, wherein the feed device for the stacks of paper has a constant step length and the stroke of the carriage is adjustable.

8. A device according to claim 6, wherein the feed device for the stacks of paper has a constant step length and the stroke of the carriage is adjustable.

9. A device according to claim 4, wherein a supply for the binding strip is mounted outside the movable carriage.

10. A device according to claim 6, wherein a supply for the binding strip is mounted outside the movable carriage.

11. A device according to claim 10, wherein the supply is such that the binding strip is drawn from the supply during the forward movement of the carriage.

12. A device according to claim 11, wherein the supply includes a means to prevent backward movement of the binding strip during the forward movement of the carriage.

13. A device according to claim 12 wherein said means is a suction wheel disposed on the carriage.

14. A device according to claim 13, wherein the suction wheel has means to prevent backward rotation.

15. A device according to claim 1, wherein the application station has a guide shoe having a pressure surface for the binding strip.

16. A device according to claim 15, wherein the guide shoe has a suction device which is effective during the forward movement of the carriage.

17. A device according to claim 16, wherein the suction device may be acted upon by compressed air while the binding strip is applied.

18. A device according to claim 1, wherein the cutting device has a cutter which cooperates with an abutment on the application station.

19. A device according to claim 18, wherein the abutment is disposed on the guide shoe in the form of a synthetic material roller which is resettable by rotation.

20. A device according to claim 1, wherein the pressing device has a clamping bar which moves the stacks of paper which project beyond an edge of a pivotable table, towards the application station.

21. A device according to claim 20, wherein the binding strip is applied to an edge region of the front-or rear side adjacent the the back of the stack of paper and is applied in a subsequent pressing station onto the back and the other edge region.

22. A device according to claim 21, wherein the pressing station has an impression roller which may be guided along the back and along the not yet bound edge region.

23. A device according to claim 22, wherein the impression roller is made from an inherently resilient material.

24. A device according to claim 22, wherein the impression roller is guided on an angular guideway.

* * * * *